United States Patent [19]

Urynowicz et al.

[11] 4,093,148
[45] June 6, 1978

[54] TAPE PATH FOR A MAGNETIC TAPE TRANSPORT SYSTEM

[75] Inventors: James P. Urynowicz, Los Angeles; Daniel R. O'Neill, Santa Monica; Hale M. Jones, Playa Del Rey; Alan Painter, Los Angeles, all of Calif.

[73] Assignee: Telex Computer Products, Inc., Tulsa, Okla.

[21] Appl. No.: 623,469

[22] Filed: Nov. 5, 1975
(Under 37 CFR 1.47)

[51] Int. Cl.² ............................................. G11B 15/58
[52] U.S. Cl. ................................................ 242/182
[58] Field of Search ............... 242/182, 183, 184, 185; 226/95, 97, 91, 118

[56] References Cited

U.S. PATENT DOCUMENTS

| 3,112,473 | 11/1963 | Wicklund et al. | 242/185 X |
| 3,180,549 | 4/1965 | Buhrendorf et al. | 242/182 X |
| 3,217,995 | 11/1965 | Sweeney | 242/185 |
| 3,380,682 | 4/1968 | Georgantas et al. | 242/182 |
| 3,563,492 | 2/1971 | Ferrier, Jr. | 242/184 |
| 3,645,472 | 2/1972 | Audeh | 242/182 |
| 3,823,895 | 7/1974 | Jones et al. | 242/182 |

Primary Examiner—George F. Mautz

[57] ABSTRACT

The invention is a tape path of a magnetic tape which is incorporated in a tape transport system. The tape path includes a file reel and a machine reel, each reel driven by a drive motor, a capstan, a magnetic head and a control system for controlling the two drive motors and the capstan. The tape path also includes a pair of vacuum chambers disposed in a V with the vertex of the V formed at their closed ends, a pair of auxiliary vacuum chambers disposed adjacent to each vacuum chamber, and a set of rollers and air bearings to guide the magnetic tape along the tape path.

3 Claims, 3 Drawing Figures

U.S.Patent   June 6, 1978   Sheet 1 of 2   4,093,148

TAPE PATH FOR A MAGNETIC TAPE TRANSPORT SYSTEM

BACKGROUND OF THE INVENTION

1. Field of the Invention

This invention relates to tape transport systems, and more particularly to magnetic tape transport systems having a new improved tape path so that the same precise control of the movement of the tape during bidirectional, continuous or intermittent, operation presently possible in some systems, may be maintained in a more compact tape transport system.

2. Description of the Prior Art

Currently available tape transport systems employ capstan drive mechanisms that frictionally engage the tape and various servo means to achieve the desired control of tape movements. The magnetic tape must be moved at high nominal speeds, such as 75–150 inches per second (ips), but must at the same time be handled gently to avoid tape breakage, stretching or wear of the oxide surface. In addition, the tape must be maintained stably in a precise tape path as it passes the magnetic recording and reproducing head assembly. Complex problems arise in fulfilling each of these requirements for magnetic tape transport systems, which are also required to operate intermittently and bidirectionally. Magnetic tape transport systems must start and stop the tape in very brief time intervals and over very short distances (0.065 inches) in order to meet the demands of associated data processing equipment.

Vacuum chambers are employed as buffer mechanisms in these systems to provide tape loops of variable length interspersed in the tape path between high inertia storage reels and a low inertia capstan drive mechanism. The magnetic tape can be rapidly started and stopped between these buffer mechanisms while the relatively slow action of the high inertia storage reels is compensated by changes in the loop lengths within the adjacent buffer mechanisms. Accordingly, only the relatively short length, very low weight tape section located between the buffer mechanisms is acted on by the drive mechanism, so that start-stop times of the order of a relatively few milliseconds may easily be achieved.

U.S. Pat. No. 3,217,995, entitled Tape Buffer Means, issued to Jack F. Sweeney on Nov. 16, 1965, teaches a tape buffer providing transistory storage and a buffer means for a tape transpot to dampen the longitudinal oscillations caused by subjecting the tape to sudden start operations. The vacuum chambers are disposed in a V-shaped manner. U.S. Pat. No. 3,563,492, entitled Capstan Acceleration Control System for Wideband Instrumentation Magnetic Tape Transport, issued to Herman A. Ferrier, Jr. on Feb. 16, 1971 also teaches a pair of vacuum chambers arranged in a V-shaped manner. In both of these systems the tape reels are disposed about the base of the V formed by the two vacuum chambers.

U.S. Pat. No. 3,112,473, entitled Tape Storage Apparatus for Tape Processing Units, issued to Harold Wicklund and Hugo A. Panissidi on Nov. 26, 1963, teaches a pair of open ended, elongated upstanding adjacent inner and outer vacuum columns disposed on each side of the tape drive capstan. The unreeled tape forms loop within the vacuum chambers. This system according to U.S. Pat. No. 3,645,472, entitled High-Performance Tape Memory System, issued to Azmi S. Audeh on Feb. 29, 1972 may be used only in a stand alone unit and will not fit onto a standardized mounting rack of 19 by 24 inches as adopted by the data processing industry. U.S. Pat. No. 3,645,472 teaches a magnetic tape transport which provides a straight line tape threading path with substantial wrap about a drive capstan and adequately long buffer loops by adjacent disposition of similarly inclined but asymmetrically disposed vacuum chambers.

U.S. Pat. No. 3,823,895, entitled Automatic Tape Loading Apparatus and Method Therefor, issued to Hale M. Jones and James P. Urynowicz on July 16, 1974, teaches an automatic tape loading system for a magnetic tape transport system. The patent also teaches the use of auxiliary vacuum chambers in conjunction with vertically disposed vacuum chambers.

U.S. Pat. No. 3,380,682, entitled Magnetic Tape Transport, issued to Peter D. Georgantas, Ronald E. Loosen and Edward S. Kinney on Apr. 30, 1968, teaches a magnetic tape transport in which the tape passes between two planes. The vacuum chambers are arranged in a V and placed in one plane and the tape reels are placed in another plane. The purpose of this arrangement is to achieve a compact unit, but this unit is still larger than a standardized mounting rack.

In 1966 IBM developed a magnetic tape transport system which is typical of most tape transport systems in current use. The tape transport systems is described in U.S. Pat. No. 3,261,563, entitled *Magnetic Tape Reel Control Servo System*, issued on July 19, 1966 to Jesse I. Aweida, Donald K. Close and Henry C. Pao. The tape transport system includes a file reel, a first servo motor for driving the file reel, a machine reel, a second servo motor for driving the machine reel, a magnetic head mounted between the reels, a capstan for driving the tape bidirectionally past the magnetic head, a pair of parallel slack tape vacuum columns, each of which has an open end disposed adjacent each of the reels on opposite sides of the magnetic head, and a control system. The vacuum columns serve to greatly reduce the length of magnetic tape to be accelerated by the capstan thereby providing a smooth and rapid start-stop motion.

Presently IBM manufactures two standard magnetic tapes for use in the computer industry having bit densities of 1600 and 800 bits per inch and gaps of 0.6 inches between each block of data. IBM has recently developed a high density magnetic tape having a bit density of 6250 bits per inch with a gap of 0.3 inch between each block of data. The high density magnetic tape must be accelerated to 200 inches per second (ips) within 0.065 inch of magnetic tape in order to be fully utilized. The IBM tape transport system, described in U.S. Pat. No. 3,261,563, reaches a speed of 200 inches per second (ips) and reaches full speed within 0.065 inch of magnetic tape. The main problem with this system is that its dimensions are 30 inches wide, 66 inches high, and 30 inches deep. The size of a standard tape transport system in the computer industry is 19 inches wide, 24.5 inches high, and 26 inches deep, which allows mounting in a standard RETMA cabinet. Even when the speed and acceleration requirements of a computer system are reduced from 200 inches per second to 125 inches per second, the IBM tape transport system still cannot be reduced to the size of this tape transport system cabinet. This makes interfacing the tape transport system with a computer system difficult and expensive.

Another tape transport system has been developed by Wangco wherein a tape transport system described in U.S. Pat. No. 3,866,855, entitled *Tape Tension and Velocity Conrol System*, issued on Feb. 18, 1975 to Phillip Stuart Bryer, has a maximum magnetic tape speed of 75 inches per second, but its dimensions are such that it can be placed in a standard cabinet. The Bryer tape transport system comprises a frame on which are mounted a supply reel and a take-up reel, suitable drive motors and controls for the reels are mounted out of sight behind the reels, a length of magnetic tape extends between the reels and through a normal operative path comprising a first tape loop in a first vacuum buffer chamber, a pucker pocket or auxiliary buffer chamber, a magnetic head region, a drive capstan, and a second tape loop within a second vacuum buffer chamber. Assorted tape guides and rollers such as are situated along the tape path to help guide the magnetic tape. The two vacuum buffer chambers are open-ended and each vacuum buffer chamber includes a pair of parallel sidewall plates, one of which is common to both vacuum buffer chambers, a front plate, a back plate, and a base plate. The two base plates are disposed at opposite ends of the common sidewall plates. The supply reel and the take-up reel are disposed adjacent to each other and each reel is adjacent the first vacuum column.

The problem that arises is that when all the requirements of the new magnetic tape, including a tape speed of 125 inches per second and an acceleration to full speed within 0.065 inch, are met this tape transport system would not fit into a standard cabinet.

SUMMARY OF THE INVENTION

In view of the foregoing factors and conditions characteristic of the prior art is an object of the present invention to provide a tape path for use in a tape transport system that will meet the speed and acceleration requirement of the new, high-density magnetic tapes.

It is still another object of the present invention to develop a more compact magnetic tape transport system than the presently available magnetic tape transport system, and more particularly a magnetic tape system that will fit in a cabinet 19 inches wide and 24.5 inches high.

It is yet another object of the present invention to provide a magnetic tape transport system which is a simplified and precise system for controlling the tension and velocity of a magnetic tape used in data processing applications.

It is still another object of the present invention to provide a magnetic tape transport system for data recording and retrieval which achieves bidirectional and intermittent operation with minimum accelerational and decelerational intervals.

It is a further object of the present invention to provide an improved magnetic tape transport system which greatly reduces instantaneous tape speed variations.

In accordance with an embodiment of the present invention within a tape transport system a tape path which includes a file reel, a first motor for driving the file reel, a machine reel, a second motor for driving the machine reel, a pair of rectangular vacuum chambers, where each chamber includes two sidewall plates, a front plate, a back plate and a base plate and has an open end and a closed end, with the two vacuum chambers forming a V with their closed ends at the vertex of the V and the vertex disposed adjacent to both the file reel and the machine reel; a pair of V-shaped auxiliary vacuum chambers where each auxiliary vacuum chamber includes two sidewall plates, a front plate, a back plate and is disposed adjacent to each vacuum chamber at its open end and shares a common sidewall plate therewith; the tape path also includes a magnetic head disposed approximately on a centerline drawn between the file reel and machine reel and also between the two vacuum chambers and the two auxiliary vacuum chambers, two rollers, with a roller being disposed on each non-common sidewall plate of the vacuum chambers, three air bearings, one of which is disposed on each common sidewall plate of the auxiliary vacuum chambers, and the third of which is disposed on the non-common sidewall plate of one of the auxiliary vacuum chambers and adjacent to the magnetic head, a capstan for accelerating the magnetic tape is disposed on the non-common sidewall plate of the other auxiliary vacuum chamber.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figure.

DESCRIPTION OF THE PREFERRED EMBODIMENT

Figure 1:
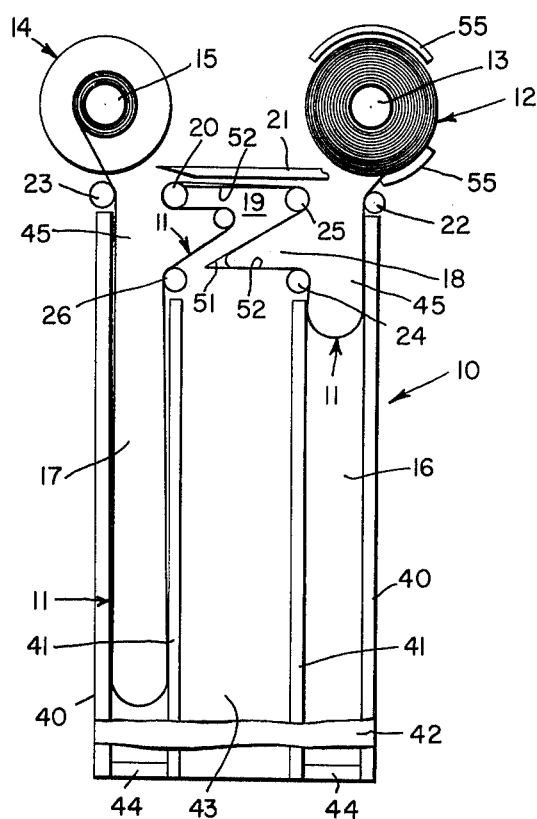
FIG. 1 is a schematic drawing of a first tape transport system having a tape path incorporating the principles taught by the Aweida patent.

The present invention is an improved tape path for a tape transport system and can best be understood by comparing it to the tape paths for two standard tape transport systems. FIG. 1 is a schematic drawing of a first tape transport system 10 taught by the Aweida patent. Referring to FIG. 1 the first tape transport system 10 has a tape path 11 which includes a file reel 12 for storing a magnetic tape, a first drive motor 13 for driving the file reel 12, a machine reel 14, a second drive motor 15 for driving the machine reel 14, a first vacuum chamber 16 and a second vacuum chamber 17, a first auxiliary vacuum chamber 18 and a second auxiliary vacuum chamber 19, a capstan 20, a magnetic head 21, a first roller 22 and a second roller 23, a first air bearing 24, a second air bearing 25, and a third air bearing 26, and a control unit for controlling the first and second drive motors 13 and 15 and the capstan 20. The machine reel 14 is disposed adjacent to the file reel 12 in such a manner that the magnetic tape unwinds from the file reel 12 forming a loop of magnetic tape. The first and second vacuum chambers 16 and 17 are two parallel rectangular columns, each of which has an outer sidewall plate 40, an inner sidewall plate 41, which is parallel to the outer sidewall plate 40, a front plate 42, a back plate 43 and a base plate 44. The top ends 45 of both vacuum chambers 16 and 17 are open and are adjacent to the file reel 12 and the machine reel 14.

The first and second auxiliary vacuum chambers 18 and 19 are disposed adjacent to the first and second vacuum chambers 16 and 17 and share a common sidewall plate 51. Each of the two auxiliary vacuum chambers 18 and 19 also has a non-common sidewall plate 52, both of which are parallel, disposed in such a manner as to form a V with the common sidewall plate 51, a front plate 42 and a back plate 43.

The first and second rollers 22 and 23 are disposed adjacent to the outer sidewall plates 40 of the vacuum chambers 16 and 17. The first air bearing 24 is disposed adjacent to the inner sidewall plate 41 of the first vacuum chamber 16. The second air bearing 25 is disposed adjacent the vertex of the V formed by the common sidewall plate 51 and the non-common plate 52 of the second auxiliary vacuum chamber 19. The third air bearing 26 is disposed adjacent to the inner sidewall plate 41 of the second vacuum chamber 17. The capstan 20 is disposed adjacent to the non-common sidewall plate 52 of the second auxiliary vacuum chamber 19 and opposite both the second and first air bearings and 24. The magnetic head is disposed between the capstan 20 and the second air bearing 25. The tape transport system 20 also has an automatic loading device 55 for automatically loading the file reel 12.

Figure 2:
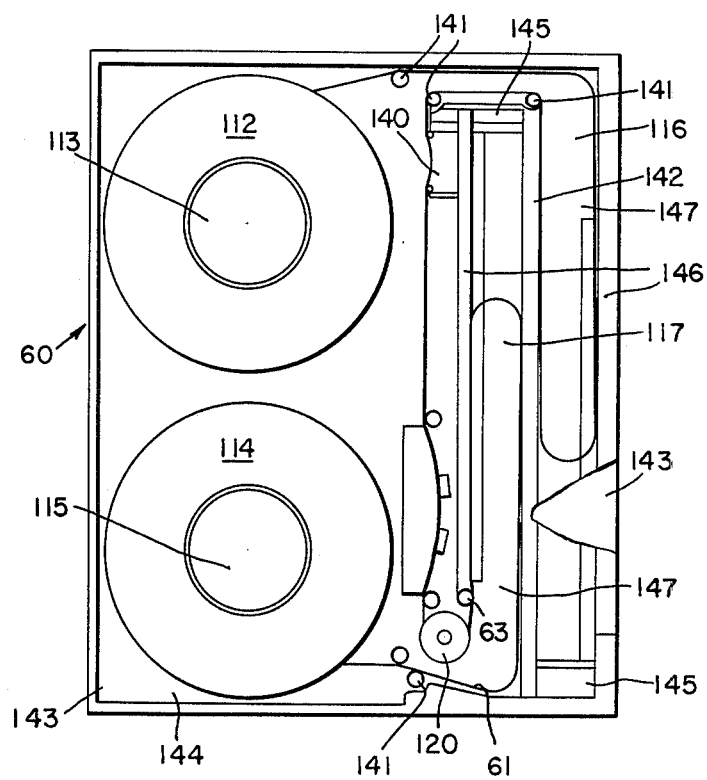
FIG. 2 is a schematic drawing of a second tape transport system having a tape path incorporating the principles taught by the Bryer patent.

FIG. 2 is a schematic drawing of a second tape transport system 60 taught by the Bryer patent. Referring now to FIG. 2 the second tape transport system 60 has a tape path 61 which includes many of the same elements as the tape path 11 of the first tape transport system 10. The common elements are a file reel 112, a first drive motor 113, a machine reel 114, a second drive motor 115, a first vacuum chamber 116, a second vacuum chamber 117, a capstan 120, a magnetic head 121 and a control unit for controlling the first and second drive motors 113 and 115 and the capstan 120. The tape path 61 also includes only one auxiliary vacuum chamber 140, a set of guide rollers 141, disposed along the tape path 61 on which the magnetic tape is guided. The first and second vacuum chambers 116 and 117 are two parallel, rectangular columns adjacent to each other and share a common sidewall plate 142, each column includes a front plate 143, a back plate 144, a base plate 145 and a non-common sidewall plate 146. The top end 147 of each vacuum chamber is adjacent to the base plate 44 of the other vacuum chamber.

The file reel 112 is adjacent to the machine reel 114 and is disposed in such a manner that the magnetic tape unwinds from the file reel 112 forming a loop of magnetic tape. Both the file reel 112 and the machine reel 114 are adjacent to the non-common sidewall plate 146 of the second vacuum chamber 17, with the file reel 112 being nearest its open end 147. The magnetic head 121 is disposed between the file reel 112 and the non-common sidewall plate 146 of the second vacuum chamber 117. The capstan 120 is disposed between the magnetic head 121 and the open end 147 of the second vacuum chamber 117.

Figure 3:
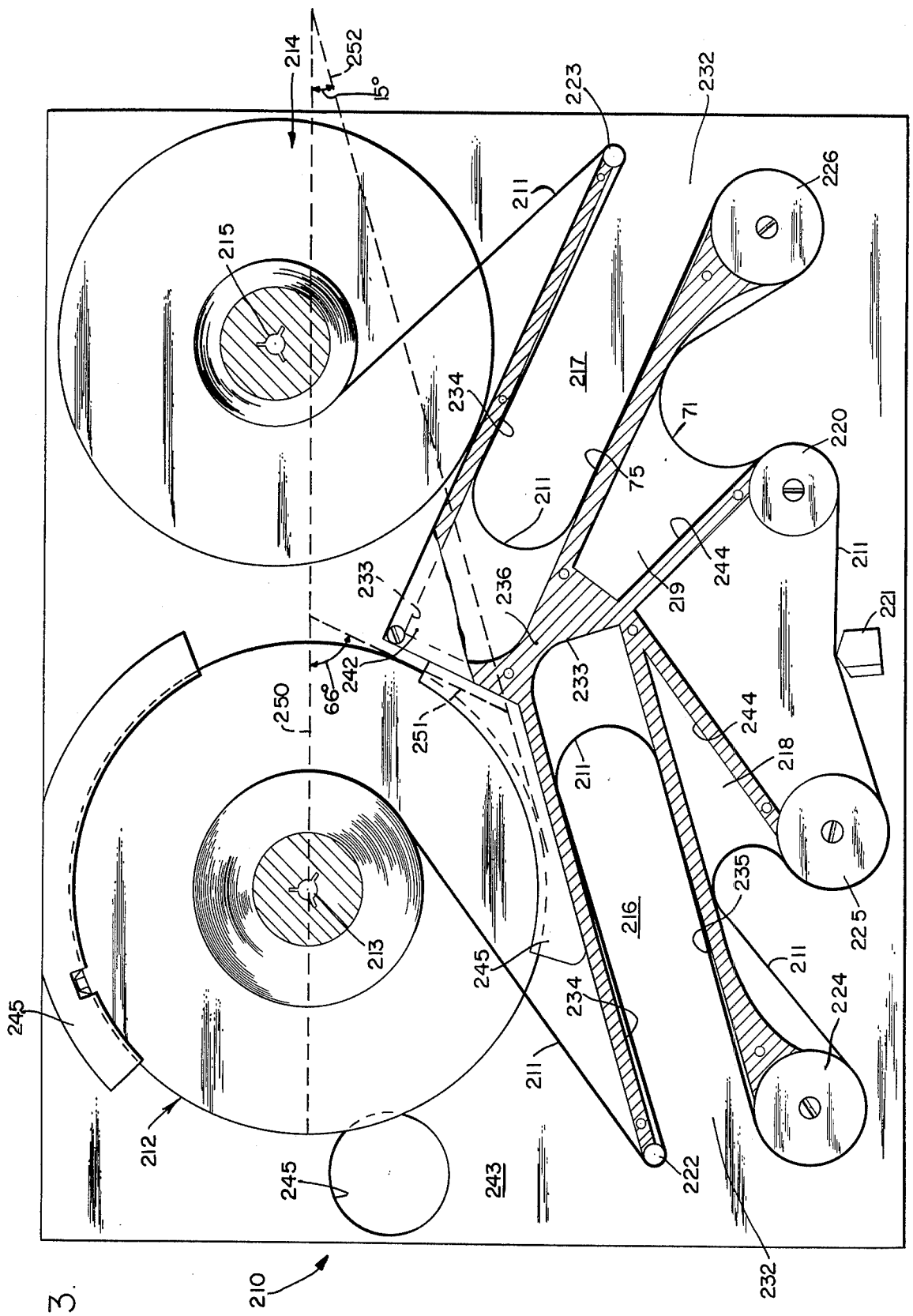
FIG. 3 is a schematic drawing of a tape transport system having a tape path in accordance with the principles of the present invention.

FIG. 3 is a schematic drawing of an improved tape transport system 210 which incorporates a new tape path 211. Referring to FIG. 3 the new tape path 211 includes many elements common to both the tape paths 11 and 61 of the first and second tape transport systems 10 and 60. The common elements include a file reel 212, a first drive motor 213, a machine reel 214, a second drive motor 215, a first vacuum chamber 216, a second vacuum chamber 217, a first auxiliary vacuum chamber 218, a second auxiliary vacuum chamber 219, a capstan 220, a magnetic head 221, a first roller 222, a second roller 223, a first air bearing 224, a second air bearing 225, a third air bearing 226, and a control unit for controlling the first and second drive motors 213 and 215 and the capstan 220. The machine reel 214 is adjacent to the file reel 212 in such a manner that the magnetic tape unwinds from the file reel 212 in a clockwise direction and winds into the machine reel 214, forming a loop of magnetic tape. The first and second vacuum chambers 216 and 217 are two non-parallel, rectangular columns, having an open end 232 and a closed end 233, each of which has a first sidewall plate 234, a second sidewall plate 235, parallel to the first sidewall plate 234, a base plate 236, a front plate 242 and a back plate 243, and which are disposed in the shape of a V, the vertex of which is formed by the closed ends 233 of the two vacuum chambers 216 and 217.

The first and second auxiliary vacuum chambers 218 and 219, are disposed adjacent to the first and second vacuum chambers 216 and 217, each of which is formed by a third sidewall plate 244 disposed in such a manner that it forms a V with the second sidewall plate 235, the vertex of which is located adjacent to the closed end 233 of each vacuum chamber.

The first and second rollers 222 and 223 are disposed adjacent to the sidewall plates 234 of the first and second vacuum chambers 216 and 217. In an alternative embodiment these rollers 222 and 223 may be replaced by air bearings.

The first air bearing 224 is disposed adjacent to the second sidewall plate 235 of the first vacuum chamber 216. The second air bearing 225 is disposed adjacent to the third sidewall plate 244 of the first auxiliary vacuum chamber 218. The third air bearing 226 is disposed adjacent to the second sidewall plate 235 of the second vacuum chamber 217. In another alternative embodiment these air bearings may be replaced by rollers. The capstan 220 is disposed between the second air bearing 225 and the third air bearing 226 adjacent the third sidewall plate 244 of the second auxiliary vacuum chamber 219. The magnetic head 221 is disposed between the capstan 220 and the second air bearing 225.

The tape transport system 220 also includes an automatic loading device 245 similar to the automatic device 55 of the first tape transport system 10. The improved tape path 71 allows the tape transport system 210 to include the automatic loading device 245 and still be able to fit in a standard cabinet.

Among the more narrow and more specific improvements of the tape path are a machine reel 214 having a diameter of 9.5 inches rather than a diameter of 10.5 inches. This reduction of machine reel 214 diameter provides additional space within the limited space of the standard cabinet, and a set of exact linear and angular dimensions and relationships that allow the tape transport system 210 to fit in a standard cabinet. In general, this tape transport system 210 is more compact than other tape transport systems which have similar performance capabilities. When the following set of exact dimensions and relationships are used, the tape transport system will fit in a standard cabinet of 19 inches wide and 24.5 inches high.

A line 250 which is horizontal and which passes through the center of the file reel 212 may be drawn so that it can intersect a tangent line 251 on the file reel at an angle in the range of 55° to 75°. Preferably 66° below the horizontal line 250, and the second vacuum chamber 217 is disposed orthogonal to the tangent line 251 with its closed end 233 adjacent thereto. The first vacuum chamber 216 is disposed parallel to to a tangent line 252 which is drawn so that it intersects the horizontal line 250 below thereto and at an angle in the range of 10° to 20°, preferably 16.5°. The tangent line 251 is tangent to the file reel 212 and the first vacuum chamber 216 has its closed end 233 orthogonal thereto. With angles of 66° and 16½° the width of the vacuum chambers is maximized for this tape transport system 210. The wider the vacuum chambers 216 and 217, the quieter and smoother the tape path 211 is. The machine reel 214 with its reduced diameter of 9.5 inches enables the second vacuum chamber 217 to pass the machine reel 214 without hitting it. The first vacuum chamber 216 is disposed adjacent to both the second vacuum chamber 217 at their respective closed ends 233 and the file reel 212 at its first sidewall plate 234. These are the key relationships in fitting this tape transport system 210 in a standard cabinet.

The prerequisite operational requirements are met because the tape path 211 allows the magnetic tape to be smoothly accelerated in the vacuum chambers 216, 217, 218 and 219 over the air bearings 224, 225 and 226 by the capstan 220, all of which are substantially in a straight line. By bending the magnetic tape after it leaves the two reels 212 and 214 and before it enters the vacuum chambers 216 and 217, this tape transport system 210 is able to reduce the space occupied by the tape transport system 210 while meeting acceleration and velocity requirements of the computer industry.

The capstan accelerates the tape within the vacuum chambers 216, 217, 218 and 219 over the bearings 224, 225 and 226 up to the required speed, there being sufficient slack tape to allow the file reel 212 and the machine reel 214 to match the tape speed.

Until the invention of this tape path there has been no tape transport system which can fit into a standard cabinet and still perform to the required acceleration and speed requirement of recently developed magnetic tapes. The advantage of such tape transport system includes reduced cost and easy interfacing of the system with existing units.

From the foregoing it can be seen that a tape path has been described. Accordingly it should be noted that the schematic is not drawn to scale, and distance of and between the figures are not to be considered significant.

Accordingly, it is intended that the foregoing disclosure and showing made in the drawing shall be considered only as illustrations of the principles of the invention. The invention is set forth in the appended claims.

What is claimed is:

1. Within a magnetic tape transport system, which includes:
   a. a file reel disposed in a particular plane, the file reel storing a magnetic tape;
   b. a machine reel disposed in the same plane as the file reel and adjacent to the file reel;
   c. a file reel drive motor for driving the file reel;
   d. a machine reel drive motor for driving the machine reel;
   e. a magnetic head disposed approximately on a center-line drawn between the file reel and the machine reel;
   f. a capstan for driving the magnetic tape bidirectionally between the file reel and the machine reel;
   g. a control system for controlling the file reel drive motor, the machine reel drive motor and the capstan, a tape path comprising:
      1. a first vacuum chamber and a second vacuum chamber, each of said vacuum chambers being disposed in the same plane as the file reel and the machine reel and having a front plate, a back plate, a base plate and a pair of parallel sidewalls, one sidewall of said first vacuum chamber is adjacent to the file reel and one sidewall of the second vacuum chamber; is adjacent to the machine reel, said first and second vacuum chambers being disposed in such a manner that said parallel sidewall plates of said first vacuum chamber form a V with said parallel sidewall plates of said second vacuum chamber with both of said base plates at the vertex of said V, said first vacuum chamber is disposed parallel and adjacent to a line tangent to said file reel, said tangent line intersecting the horizontal line of said file reel at an angle in the range of 10° to 20° and said second vacuum chamber is disposed perpendicular and adjacent to a line tangent to said file reel, said tangent line intersecting the horizontal line of said file reel at an angle in the range of 60° to 70°, the horizontal line being drawn through the center of said file reel and parallel to the ground;
      2. means for guiding said magnetic tape along said tape path; and
      3. a first auxiliary vacuum chamber and a second auxiliary vacuum chamber, each of said auxiliary vacuum chambers disposed adjacent to one of said first and second vacuum chambers and having a front plate, a back plate, a pair of sidewall plates, one sidewall plate of said first auxiliary vacuum chamber being common to a sidewall of said first vacuum chamber and one sidewall plate of said second auxiliary vacuum chamber being common to a sidewall of said second vacuum chamber.

2. In a magnetic tape transport system, a tape path according to claim 1, wherein said machine reel has a diameter of less than 10.5 inches.

3. In a magnetic tape transport system, a tape path according to claim 1 wherein said machine reel has a diameter of 9.5 inches and said tape path has a width of 19 inches and a height of 24.5 inches so that it will fit in a standard cabinet.

* * * * *